(12) United States Patent
Wang

(10) Patent No.: US 8,310,588 B2
(45) Date of Patent: Nov. 13, 2012

(54) IMAGE CAPTURE SYSTEM

(75) Inventor: Shao-Hung Wang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 29 days.

(21) Appl. No.: 13/042,110

(22) Filed: Mar. 7, 2011

(65) Prior Publication Data

US 2012/0169916 A1    Jul. 5, 2012

(30) Foreign Application Priority Data

Dec. 31, 2010  (TW) .............................. 99147251 A

(51) Int. Cl.
    *H04N 5/225* (2006.01)
(52) U.S. Cl. ........................................ 348/360; 348/375

(58) Field of Classification Search .................... 348/65, 348/267–271, 340, 360, 368–371, 373–375; 257/294
See application file for complete search history.

(56) References Cited

U.S. PATENT DOCUMENTS

| 7,738,199 | B1 * | 6/2010 | Wen .............................. 359/892 |
| 7,780,365 | B2 * | 8/2010 | Woo .............................. 396/529 |
| 2009/0109328 | A1 * | 4/2009 | Moon et al. .................. 348/374 |

* cited by examiner

*Primary Examiner* — Tuan Ho
*Assistant Examiner* — Zhenzhen Wu
(74) *Attorney, Agent, or Firm* — Altis Law Group, Inc.

(57) ABSTRACT

An image capture system comprises a lens module, a color filter frame, and a cover. The lens module has an image sensor received in the cover. The cover has a threaded hole corresponding to the image sensor. The color filter frame comprises at least one bracket and a fixing frame. The bracket including a color filter is fixed by the fixing frame corresponding to the threaded hole.

6 Claims, 4 Drawing Sheets

IMAGE CAPTURE SYSTEM

BACKGROUND

1. Technical Field

The present disclosure generally relates to image capture systems, and particularly to an image capture system with color filter frame.

2. Description of the Related Art

Image capture systems are commonly used in still cameras, video cameras, land surveying equipment, and other devices. The image capture system mainly comprises a lens module, an image sensor, and a circuit board. A commonly used image capture system includes a color filter fixed above the image sensor by glue which is difficult to clean, inhibiting use of the system. A fixing mechanism of a color filter is required for easy cleaning of the image capture system.

What is needed, therefore, is an image capture system which can be easily cleaned, to ameliorate the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the image capture system. Moreover, in the drawings, like reference numerals designate corresponding parts throughout the views.

DETAILED DESCRIPTION

Embodiments of an image capture system as disclosed are described in detail here with reference to the drawings.

Figure 1:
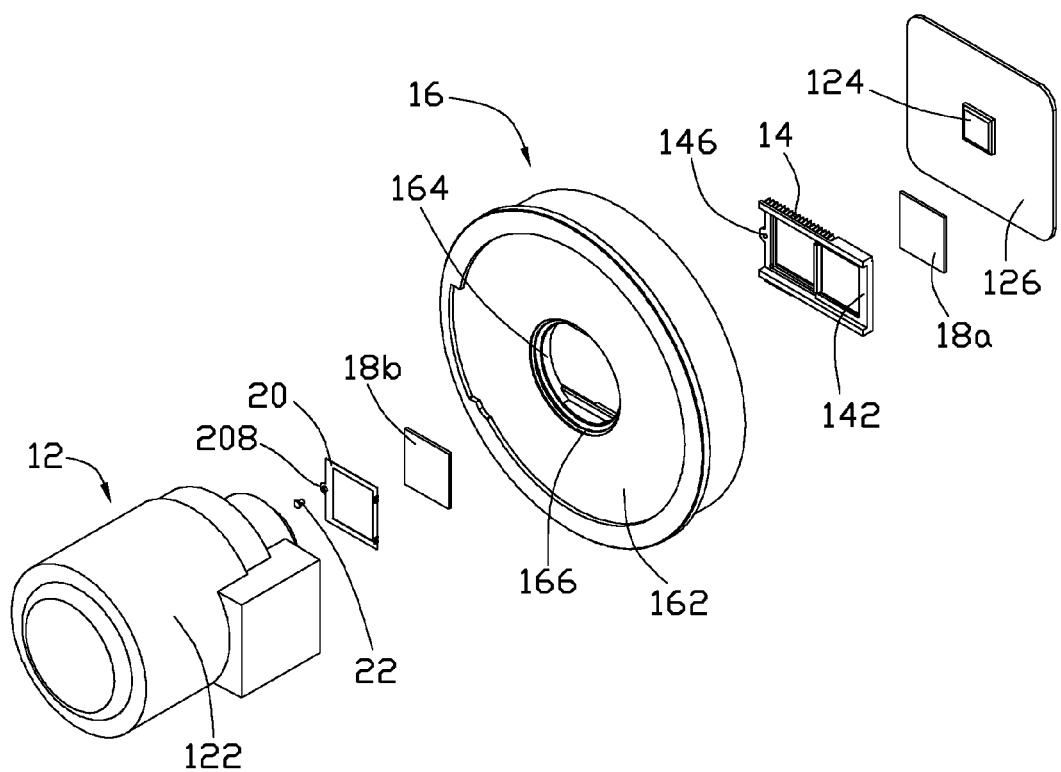
FIG. 1 is an exploded view of an image capture system in accordance with a first embodiment.

Referring to FIG. 1, an image capture system 10 in accordance with a first embodiment includes a lens module 12, a color filter frame 14, and a cover 16. The lens module 12 includes a lens 122, an image sensor 124, and a circuit board 126. The image sensor 124 is mounted on and electrically connects to the circuit board 126. The lens 122 is threaded in the cover 16 above the image sensor 124 with an optical axis focus on the image sensor 124. The image sensor 124 captures the image through the lens 122 for transmission through the circuit board 126.

The cover 16 includes a cover plate 162 and a receiving space 164. The cover plate 162 defines a threaded hole 166 matching the receiving space 164 for receiving the lens 122. The receiving space 164 receives and fixes the image sensor 124 and the circuit board 126.

The color filter frame 14 is arranged inside the receiving space 164 of the cover 16 and above the image sensor 124. The color filter frame 14 includes at least one bracket 142 and a fixing frame 20. In this embodiment, the color filter frame 14 includes two brackets 142a and 142b separately receiving two color filters 18a and 18b (see FIG. 2). The color filters 18a and 18b correspond to the image sensor 124, admitting light from the lens 122 thereto. The color filter 18a is fixed on the bracket 142a by glue and the color filter 18b is fixed on another bracket 142b by screw threads in the fixing frame 20. The configuration of the fixing frame 20 matches the bracket 142b. The fixing frame 20 is planar and includes a location rim 202 and a fixing rim 204 opposite to the location rim 202 at the circumference. The location rim 202 includes at least one location piece 206 perpendicular to the plane of the fixing frame 20 (see FIG. 3).

The location piece 206 includes a location hole 2062, and the rim of the bracket 142b corresponding to the location hole 2062 includes a post 144 received in the location hole 2062 of the location piece to fix one end of the fixing frame 20 on the bracket 142b. The fixing rim 204 includes at least one fixing hole 208, the rim of the bracket 142b corresponding to the fixing hole 208 includes a fastening threaded hole 146. A fastener 22 passes through the fixing hole 208 and is received in the fastening threaded hole 146 to fix another end of the fixing frame 20 on the bracket 142, stably attaching the color filter 18b inside the bracket 142b.

Figure 2:
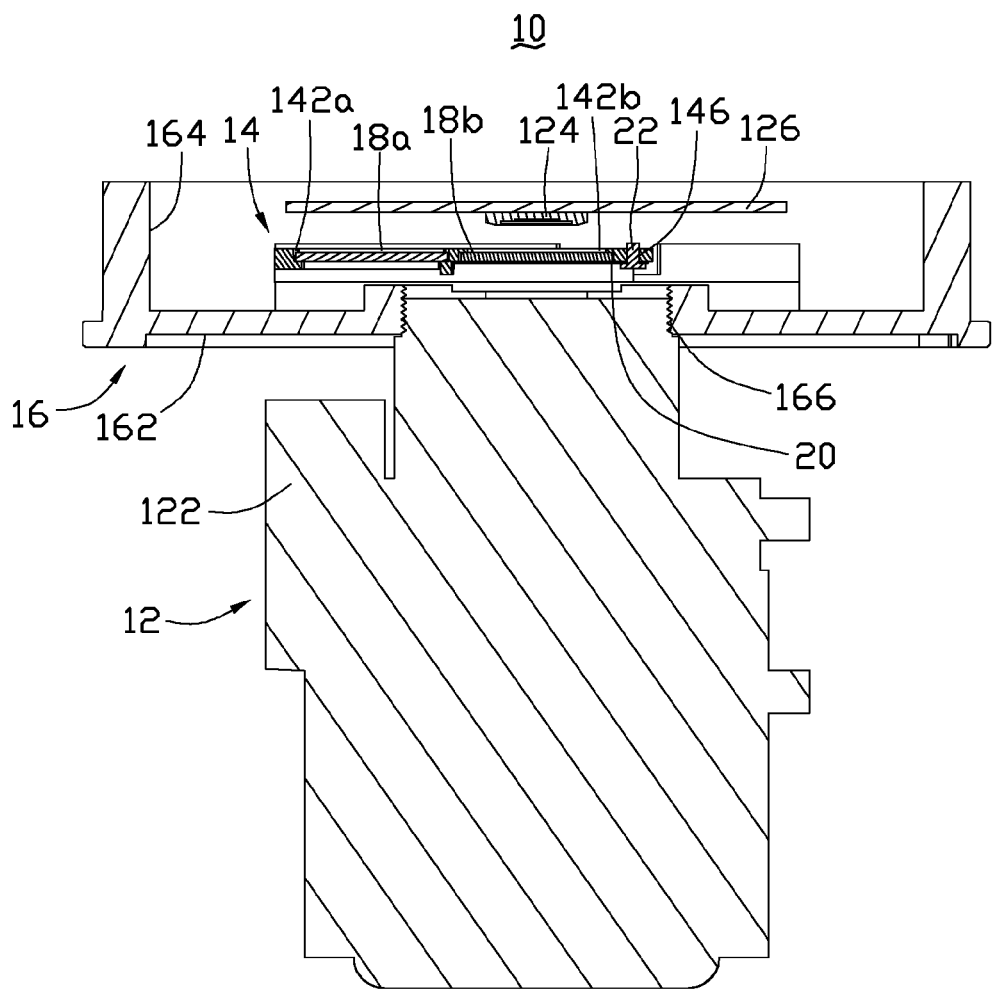
FIG. 2 is an assembly cross section of the image capture system of FIG. 1.
Figure 3:
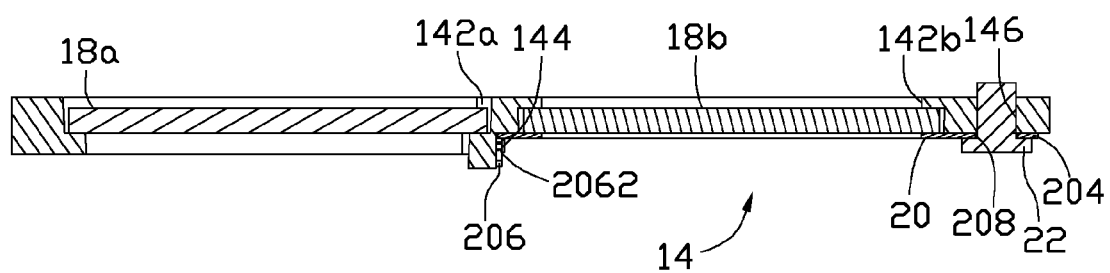
FIG. 3 is a cross section of a color filter frame of the image capture system of FIG. 1.
Figure 4:
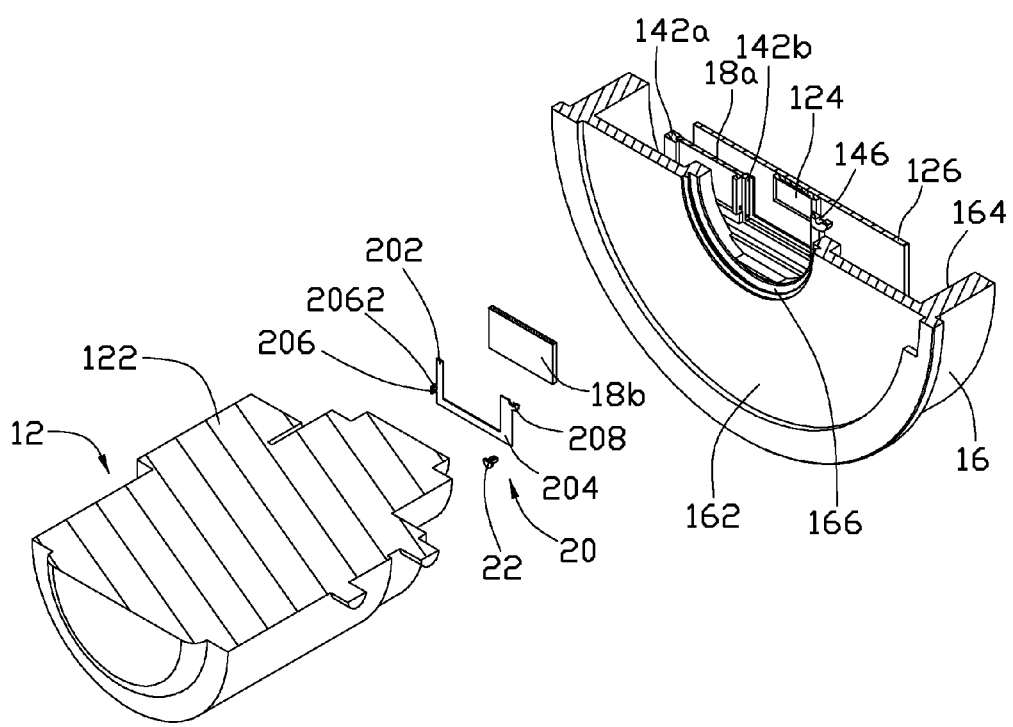
FIG. 4 is a cross section of the image capture system of FIG. 1 in use.

Referring to FIG. 2, the fixing frame 20 is fixed on the bracket 142b corresponding to the threaded hole 166 of the cover 16. The diameter of the threaded hole 166 exceeds that of the bracket 142b of the color filter frame 14. The fixing frame 20 can be assembled and disassembled easily through the threaded hole 166. For cleaning of the image sensor 124, the lens 122 is detached by unscrewing from the threaded hole 166 to remove the fastener 22 and release the post 144 from the location hole 2062 of the location piece 206 to remove the fixing frame 20 (as shown in FIG. 4). The color filter 18b can be removed from the fixing frame 20 easily, and the image sensor 124 easily cleaned through the threaded hole 166.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An image capture system comprising:
a lens module including an image sensor;
a color filter frame arranged above the image sensor including a bracket and a fixing frame; and
a cover including a threaded hole corresponding to the lens module, wherein the image sensor is inside the cover and corresponding to the threaded hole, the bracket includes a color filter fixed by the fixing frame corresponding to the threaded hole;
wherein the fixing frame matches the bracket;
wherein the fixing frame is planar with a location rim and a fixing rim opposite to the location rim at the circumference.

2. The image capture system of claim 1, wherein the location rim includes at least one location piece perpendicular to the plane of the fixing frame, the location piece includes a location hole, and the bracket includes a post received in the location hole.

3. The image capture system of claim 1, wherein the fixing rim includes a fixing hole, the bracket includes a fastening threaded hole with a fastener passing through.

4. The image capture system of claim 1, wherein the diameter of the threaded hole exceed the dimension of the bracket of the color filter frame.

5. The image capture system of claim 1, wherein the color filter frame includes two brackets.

6. The image capture system of claim 5, wherein the color filters of the two brackets are arranged parallely on the color filter frame with one fixed by glue and the other one fixed by the fixing frame.

* * * * *